(12) United States Patent
Costal Fornells et al.

(10) Patent No.: US 11,683,437 B1
(45) Date of Patent: Jun. 20, 2023

(54) PRINT FLUID DROP DISPENSATION MASK WITH ENTRY MOVED TO ENTRY FOR ADJACENT PASS TO AVOID REPEATED DISPENSATION FOR A PIXEL PER PASS

(71) Applicant: Hewlett-Packard Development Company, L.P., Spring, TX (US)

(72) Inventors: Pau Costal Fornells, Sant Cugat del Valles (ES); Peter Morovic, Sant Cugat del Valles (ES); Javier Maestro Garcia, Sant Cugat del Valles (ES); Pere Josep Canti Nicolas, Sant Cugat del Valles (ES); Sergio Etchebehere Juan, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/837,800

(22) Filed: Jun. 10, 2022

(51) Int. Cl.
*H04N 1/409* (2006.01)
*G06K 15/02* (2006.01)
*H04N 1/405* (2006.01)
*G06K 15/10* (2006.01)
*B41J 2/505* (2006.01)
*B41J 2/205* (2006.01)
*B41J 2/21* (2006.01)

(52) U.S. Cl.
CPC ........... *H04N 1/409* (2013.01); *G06K 15/107* (2013.01); *G06K 15/1881* (2013.01); *H04N 1/405* (2013.01); *B41J 2/2054* (2013.01); *B41J 2/2132* (2013.01); *B41J 2/5056* (2013.01)

(58) Field of Classification Search
None
See application file for complete search history.

(56) References Cited

U.S. PATENT DOCUMENTS

| | | | | |
|---|---|---|---|---|
| 6,508,535 B1* | 1/2003 | Klassen | ............... | G06K 15/107 347/41 |
| 9,041,978 B2* | 5/2015 | Cardells | ............... | G06K 15/102 358/529 |
| 10,239,327 B2* | 3/2019 | Gracia Verdugo | ..... | B41J 2/2132 |
| 2020/0034675 A1 | 1/2020 | Morovic et al. | | |

FOREIGN PATENT DOCUMENTS

WO        2019117919        6/2019

OTHER PUBLICATIONS

Fraser, B. "Real World Adobe Photoshop CS2: Industrial-strength Production Techniques, Contone vs. Halftone", 2006, 9 pp.
Wanling, J., "Color Halftoning Based on Neugebauer Primary Area Coverage and Novel Color Halftoning Algorithm for Ink Savings", May 2019, 100 pp.
"Colourant" Wikipedia entry, last edited Mar. 3, 2021, 2 pp.
"Continuous tone" Wikipedia entry, lasted edited Apr. 23, 2021, 1 pp.

* cited by examiner

*Primary Examiner* — Scott A Rogers

(57) ABSTRACT

Mask entries for each of a plurality of passes over which print fluid drops are to be dispensed for printing an image are generated based on different types of masks and based on image data for the image. Print fluid drop dispensation for a pixel for which the mask entries for a given pass specify repeated print fluid drop dispensation is moved to a mask entry for an adjacent pass that does not specify print fluid drop dispensation for the pixel. Ejection of print fluid to print the image is caused based on the generated mask entries.

15 Claims, 7 Drawing Sheets

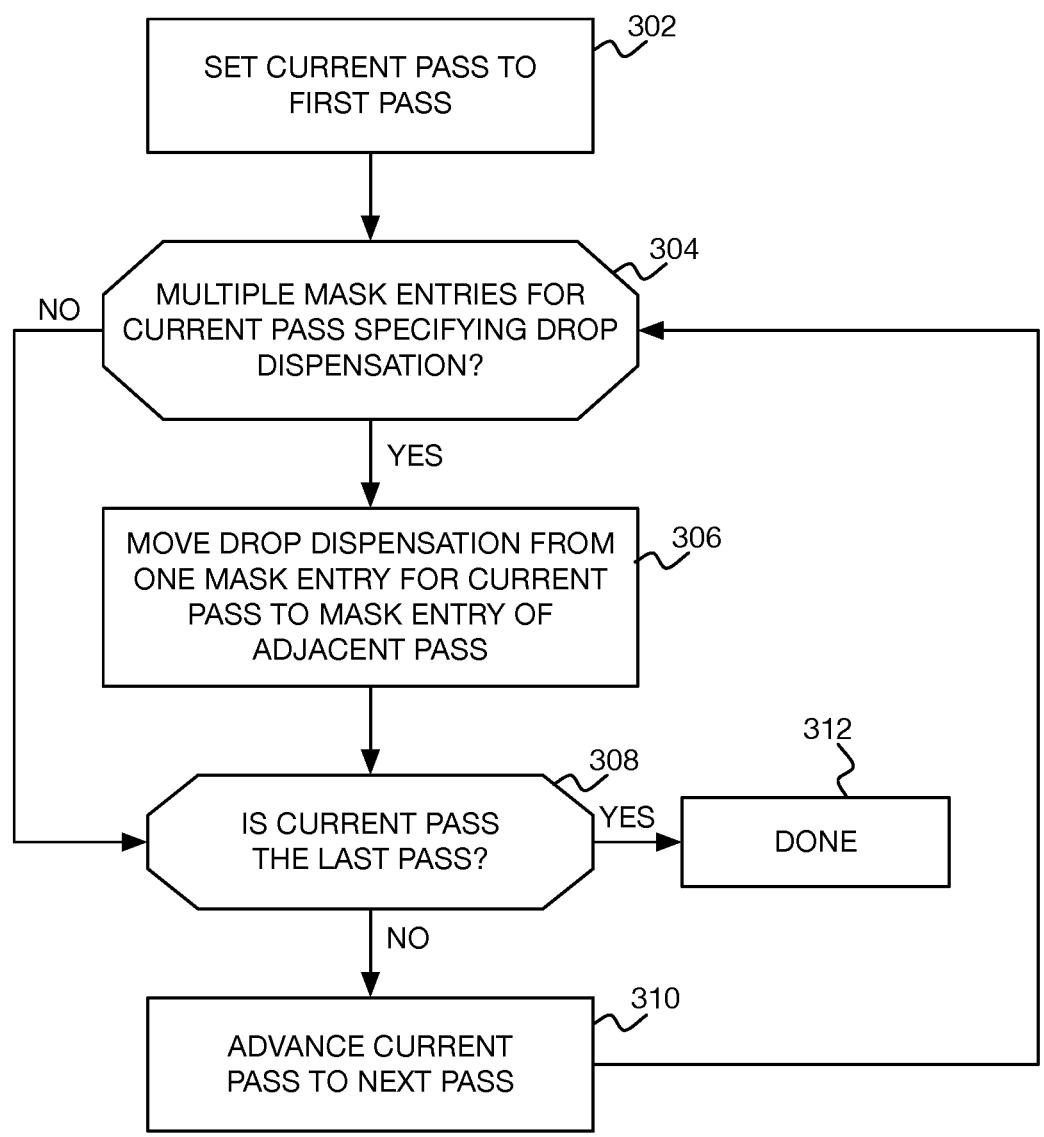

US 11,683,437 B1

PRINT FLUID DROP DISPENSATION MASK WITH ENTRY MOVED TO ENTRY FOR ADJACENT PASS TO AVOID REPEATED DISPENSATION FOR A PIXEL PER PASS

BACKGROUND

A printing device is capable of forming an image onto a print medium, such as a paper medium, a plastic medium, and so forth. A printing device can form an image on a print medium by dispensing print fluid onto selected portions of the print medium. For color printing, a printing device can dispense print fluids of different colors onto a print medium to form a color image.

BRIEF DESCRIPTION OF THE DRAWINGS

FIG. 3 is a flowchart of an example method for resolving per-pixel multiple drop dispensation within mask entries on a per-pass basis.

DETAILED DESCRIPTION OF THE DRAWINGS

Figure 1:
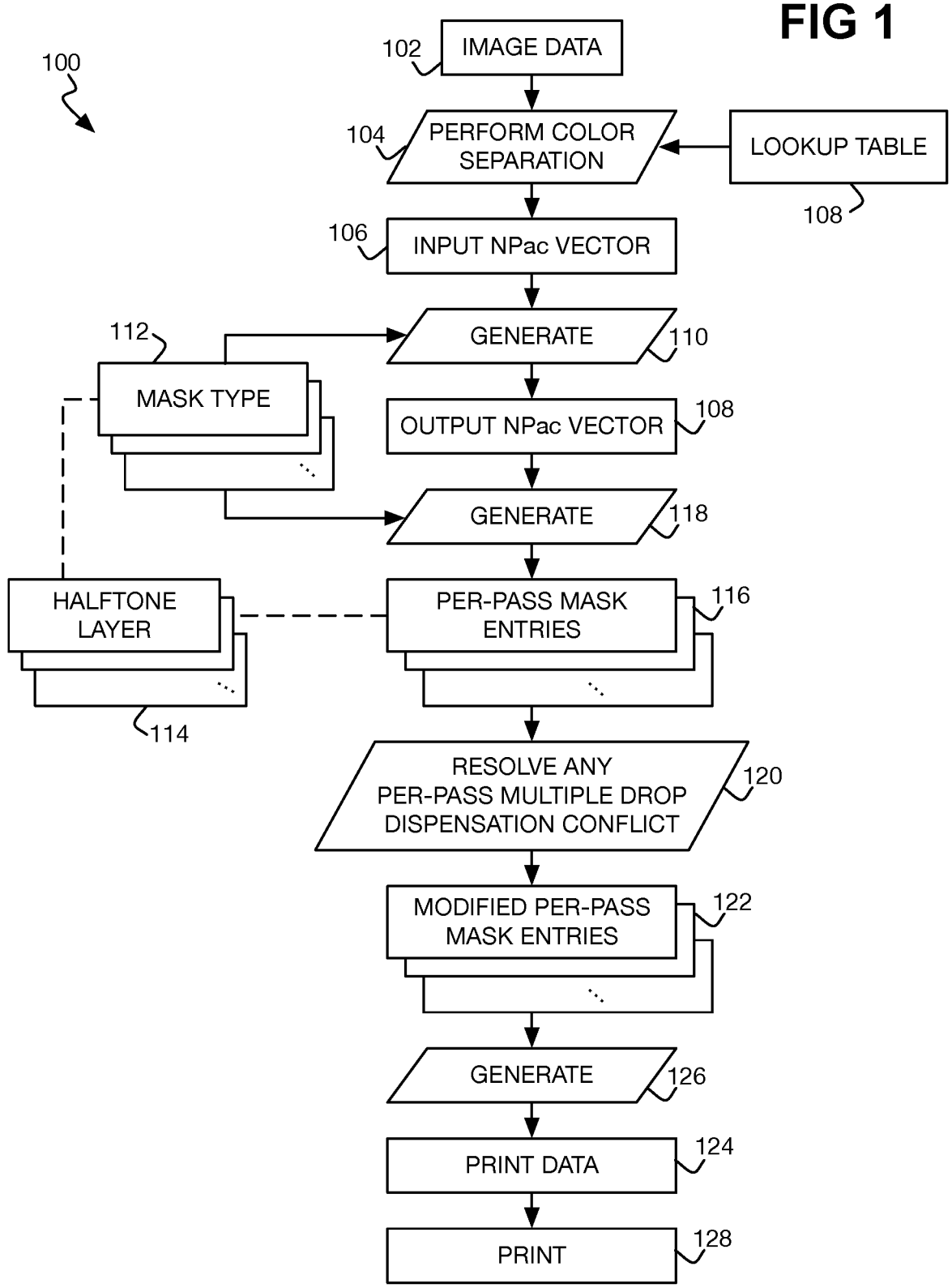
FIG. 1 is a diagram of an example process for printing an image from image data.

In some printing devices, printing masks (or more simply, "masks") can be used to control a frequency of activation of nozzles in an array of nozzles of a printhead. The nozzles of the printhead include orifices through which print fluid drops, such as ink, are dispensed as nozzles are activated. Each nozzle is associated with a fluidic actuator (e.g., a resistive heater, a deflectable membrane such as a piezoelectric membrane, etc.) that when activated causes a quantity of print fluid drops (one drop or multiple drops) to be ejected through the orifice of the nozzle.

Properties of masks can affect output quality of an image produced by a printing device, since the masks affect a distribution of print fluid drops, both spatially and temporally. A printing device can employ multiple passes when printing an image. The structures of masks used in a multiple-pass print mode can affect how subsequent passes will interact with one other. The interaction of multiple passes over the same region of an image on a print medium can produce banding defects, especially in cases where print fluids are sensitive to drying times between passes.

An example of a banding defect is Dark-Light Zone Banding (DLZB), which is a smooth banding that appears in multi-pass print modes due to changing print medium conditions as the passes progress (e.g., print fluid in a first pass lands directly on a dry print medium while print fluid in a last pass lands on top of all the print fluids deposited in previous passes).

The banding issue may be exacerbated in printers that employ relatively complex inks or use extra fluids (e.g., an optimizer) to prepare a print medium for color print fluids. The interactions between subsequent layers of print fluids and an optimizer may be sensitive to time and print fluid volume, as an output image may change substantially depending on how dry a previous layer is when the next layer of print fluid is deposited. The use of complex inks and/or extra fluids can complicate the selection of a masking strategy that provides an optimal output for all colors.

The shapes of some types of masks can allow for a relatively smooth pass-to-pass interaction to reduce the banding effect. However, these types of masks may be constrained in other aspects such as firing (activation) frequency of printhead nozzles. These types of masks may thus not be suitable for images with high density colors.

Hybrid print modes use different halftone levels, or layers, to encode mask waveforms instead of different amounts of print fluid drops. Combining such waveforms, however, can generate conflicts in the form of repetition in fluid drop dispensation for a given pixel on the same pass. Such per-pass multiple drop dispensation conflicts arise because the mask entry for each layer is generated independently and then merged into a single mask file.

Techniques described herein ameliorate these issues. Fluid drop dispensation for a pixel for which mask entries in a pass specify repeated drop dispensation is moved to a mask entry in an adjacent pass that does not specify drop dispensation for the pixel. The mask entry for which fluid drop dispensation is moved to an adjacent pass can differ depending on whether the print mode is a high-pass or low-pass print mode, to preserve image quality.

FIG. 1 shows an example process 100 for printing an image from image data 102 for the image. The image data 102 may include color data represented in an image color space. For example, the image data 102 may include image-level pixel representations in a red-green-blue (RGB) color space, a cyan-magenta-yellow black (CMYK) color space, and so on.

Color separation is performed (104) on the image data 102 to generate an input Neugebauer Primary (NPac) vector 106 for each pixel. Each input NPac vector 106 may be generated from the image data 102 using a lookup table (LUT) 108. An input NPac vector 106 is more generally a mapping of the image data of a pixel from the image color space to an intermediate color space, such as an area coverage space. In the case of an input NPac vector 106, the area coverage space is the NPac color space. The input NPac vector 106 represents a statistical distribution of NPs over a given area of a halftone.

NPacs represent the linear convex combinations of NPs. Each component of an input NPac vector 106 defines the probability of choosing a respective NP. For example, an input NPac vector 106 can define the following probabilities for respective NPs: 1/9 for W (blank or white in an example where the print target is white); 0 for C (cyan); 2/9 for M (magenta); 0 for Y (yellow); 3/9 for CM (a combination of cyan and magenta); 1/9 for CY (a combination of cyan and yellow); 1/9 for MY (a combination of magenta and yellow); 1/9 for CMY (a combination of cyan, magenta, and yellow).

An NP is a combination of colorants available to a printing device for reproducing colors that may have been received in a different color space and which have been mapped into the NPac color space. Each element of an NP may specify a quantity of a respective colorant for the associated pixel in the colorant color space. In a simple binary (bi-level, i.e., two drop states: "drop" or "no drop")

printing device, an NP may be one of 2 k−1 combinations of k print fluids within the printer, or an absence of print fluid (resulting in 2 k NPs in total).

A colorant or print fluid combination as may be formed of one or multiple colorants or print fluids such as ink. For example, if a bi-level printer uses CMY print fluids, there can be eight NPs. These NPs relate to the following: C, M, Y, CM, CY, MY, CMY, and W (white or blank indicating an absence of print fluid). An NP may include an overprint of two available print fluids, such as a drop of magenta on a drop of cyan (for a bi-level printing system) in a common addressable print area (e.g. a printable "pixel"). An NP may be referred to as a "pixel state."

In multi-level printing, including printheads that are able to deposit N>1 drop levels, an NP may include one of Nk−1 combinations of k print fluids, or an absence of printing fluid (resulting in Nk NPs in total). For example, if a multi-level printer uses CMY printing fluids with four different drop states ("no drop", "one drop", "two drops" or "three drops"), a total of 64 NPs, including for example C, CM, CMM, CMMM.

For each input NPac vector 106, an output NPac vector 108 is generated (110) using different mask types 112 respectively corresponding to different halftone layers 114. For example, each output NPac vector 108 can be generated as described in the previously filed patent application entitled, "Printing with Different Types of Masks," filed on Oct. 25, 2001, and assigned application Ser. No. 17/452,141. Generally, different mask types 112 are selected to use when dispensing print fluid drops of each given colorant when printing an image according to the image data 102. The output NPac vector 108 that is generated for an input NPac vector 106 is based on which of the mask types 112 are selected.

Examples of different mask types 112 that may be employed are described later in the detailed description. There is a mask type 112 for each halftone layer 114. Because the mask types 112 correspond to the halftone layers 114, the halftone layers 114 are used to map to different mask selections, as well as to quantities of fluid drops to employ.

For example, the halftone layers 114 may be two-bit layers, such that there are four halftone layers 114 having corresponding quantities of print fluid drops to be dispensed from a nozzle. The halftone layers 114 may be numbered from 0 through 3. Layer 0 may be a no print fluid layer corresponding to no fluid drop dispensation. Layer 1 may be a low print fluid layer corresponding to low print fluid drop dispensation, and specifies usage of a corresponding mask type 112. Layers 2 and 3 may be first and second high print fluid layers corresponding to high print fluid drop dispensation, and similarly specify usage of respective mask types 112.

The high print fluid layers are high fluid layers in that more fluid is dispensed than in the low print fluid layer. Similarly, the low print fluid law is a low fluid layer in that less fluid is dispensed than in the high print fluid layers. The same or different amounts of fluid may be dispensed in each high print fluid layer.

In the generation of an output NPac vector 108 from an input NPac vector 106, the mask types 112 are selected based on whether the amount of print fluid for a colorant specified by the input NPac vector 106 is above or below a fluid budget, or threshold, such as 0.2 drops. The first 0.2 drops of a given colorant may be mapped to halftone layer 1 such that the mask type 112 corresponding to this layer is used to generate a first intermediate NPac vector. Any printing fluid above the first 0.2 drops is then mapped to halftone layers 2 and 3, such that the mask types 112 corresponding to these layers are used to generate a second intermediate NPac vector.

The two intermediate NPac vectors are then joined together to produce the output NPac vector 108. Linear programming can be applied to the intermediate NPac vectors to generate the NPac vector 108. Since an infinite number of NPac vectors can be produced for any given drop vector, the use of linear programming allows for the placement of a constraint on the possible NPac vectors that can be output, by assigning weights to NPs based on preference or priorities of the NPs.

Each output NPac vector 108 represents the amount of print fluid to be dispensed to print a corresponding pixel. Printing itself, however, is performed over multiple print passes. Therefore, per-pass mask entries 116 are generated (118) from the output NPac vectors 108. There is a set of mask entries 116 for each pass. The mask entries 116 of each pass correspond to the halftone layers 114, and thus to the mask types 112. For example, if there are four halftone layers 114, then for each pass there are four mask entries 116, with each mask entry 116 corresponding to a different mask type 112.

The mask entries 116 can be generated from the output NPac vector 108 for each pixel in a probabilistic manner. For instance, the probability that a mask entry 116 in a given pass dispenses fluid for a pixel can be specified by a blue noise distribution having a density according to the total number of passes and the different mask type 112 (and thus the halftone layer 114) to which the mask entry 116 corresponds.

The mask entries 116 for a pass govern (i.e. specify) whether a fluid drop is to be dispensed in that pass for each pixel. The mask entries 116 can be generated using the same different mask types 112 used when generating the output NPac vectors 108. Therefore, the mask entries 116 are also generated using hybrid masking, since at least some of the mask types 112 are different.

The mask entries 116 for a pass are, as a result of such hybrid masking, generated independently of one another. This means that multiple mask entries 116 can specify fluid drop dispensation for a given pixel in the same pass. However, a nozzle of a printhead can dispense just one fluid drop for a pixel in any given pass. In this case, what is referred to as a multiple fluid drop dispensation conflict results.

Any per-pass multiple-drop dispensation conflicts within the mask entries 116 are therefore resolved (120), resulting in modified per-pass mask entries 122 in which there are no such conflicts. The manner by which multiple-drop dispensation conflicts within the mask entries 116 of a pass can be resolved is described later in the detailed description. In general, if multiple mask entries 116 in a pass specify drop dispensation for a pixel, then drop dispensation for the pixel is moved from such a mask entry 116 to a mask entry 116 in an adjacent pass.

Print data 124 can then be generated (126) from the modified per-pass mask entries 122. The print data 124 can be control data that is used to control printing operations to print (128) an image according to the image data 102. The printing operations can include advancing a print medium in a print medium direction, for instance, as well as moving a printhead in a perpendicular, printhead head direction. The printhead may be mounted on a carriage that can be moved.

Figure 2A:
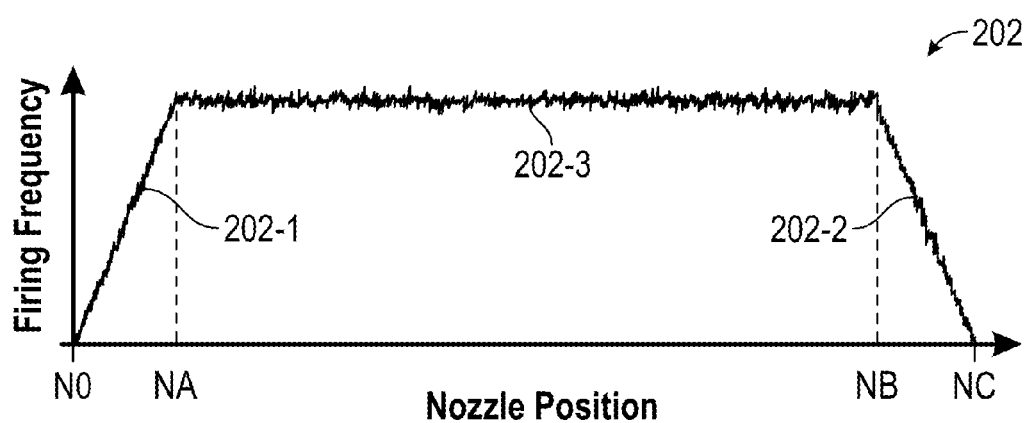
FIGS. 2A and 2B are diagrams of different example mask types.
Figure 2B:
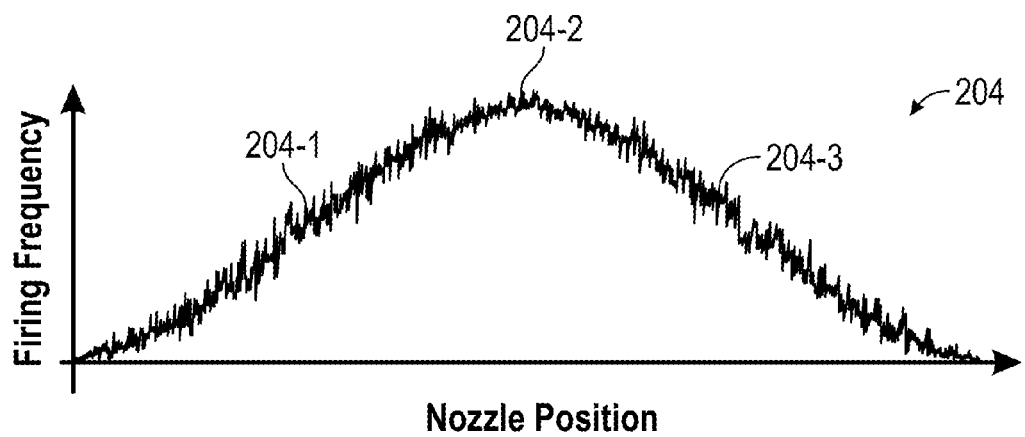

FIGS. 2A and 2B respectively show two different example mask types 202 and 204 that can be employed as the mask types in the process 100. The mask type 202 can be referred to as a trapezoid mask type 202, and may be used for each of the first and second high print fluid layers. The mask type 204 can be referred to as a square sine mask type 204, and may be used for the low print fluid layer. In each figure, the horizontal axis represents nozzle position on a printhead, and the vertical axis represents a firing frequency of nozzles (a number of times the nozzles are actuated per unit time).

The trapezoid mask type 202 of FIG. 2A thus specifies print fluid drop dispensation frequency as a function of printhead nozzle position that has a trapezoid shape. The mask type 202 has sharper features with ramps 202-1 and 202-2 at the beginning and end, respectively, that rise and fall at relatively sharp slopes. The ramp 202-1 indicates that the firing frequency of nozzles increases with nozzle position from left to right between nozzle position N0 and nozzle position NA. The ramp 202-2 indicates that the firing frequency of nozzles decreases with nozzle position from left to right between nozzle position NB and nozzle position NC. A relatively center flat portion 202-3 (between the ramps 202-1 and 202-2) of the trapezoid mask type 202 indicates that a relatively constant firing frequency is used at the nozzle positions starting at nozzle position NA and ending at nozzle position NB.

The square sine mask type 204 of FIG. 2B specifies print fluid drop dispensation frequency as a function of printhead nozzle position that has a square sine wave shape. The mask type 204 has smoother profile than the trapezoid mask type 202. When the square sine mask type 204 is used, the firing frequency gradually increases with nozzle position in rising section 204-1 until the firing frequency reaches an apex 204-2. This is followed by a gradual reduction in the firing frequency with nozzle position in a falling section 204-3.

Usage of the square sine mask type 204 provides a smoother pass-to-pass interaction of drops on each pixel from multiple passes than usage of the trapezoid mask type 202. However, the use of the square sine mask type 204 is subject to other constraints, including a reduced firing frequency that may not be suitable for printing high-density colors. Usage of the trapezoid mask type 202 with sharper boundaries can allow for higher frequency of nozzle firings to support high-density color regions, but may lead to banding issues in the image printed by the printer.

FIG. 3 shows an example method 300 for resolving per-pass multiple (i.e., repeated) fluid drop dispensation within the mask entries 116. The method 300 can be performed to realize (120) of the process 100. The method 300 is described in relation to a given pixel. However, in practice the method 300 is performed for every pixel.

The current pass is set to the first pass (302). If multiple mask entries 116 for the current pass specify drop dispensation for the pixel in question (304), then drop dispensation is moved from each of at least one such mask entry 116 for the current pass to a mask entry 116 of an adjacent pass that does not specify drop dispensation for the pixel in question (306). In general, if N mask entries 116 for the current pass specify drop dispensation for a pixel, then drop dispensation is moved from each of (N−1) mask entries 116 to a different or the same adjacent pass.

The drop dispensation may be moved from a mask entry 116 of a pass to a corresponding mask entry 116 of an adjacent pass. For example, if the mask entry 116 of the current pass for which drop dispensation is to be moved to an adjacent pass is the first high print fluid layer mask entry 116, then the drop dispensation may be moved to the first high print fluid layer mask entry 116 of an adjacent pass. The mask entry 116 from which drop dispensation is to be moved (and the mask entry 116 from which drop dispensation is not to be moved) can differ depending on the number of passes, as described later in the detailed description.

When moving drop dispensation from a mask entry 116 of the current pass to a corresponding mask entry 116 of an adjacent pass, an adjacent pass is not selected if the corresponding mask entry 116 in that pass already specifies drop dispensation for the pixel. An adjacent pass should also not be selected if another mask entry 116 (i.e., other than the corresponding mask entry 116) in that pass already specifies drop dispensation. This is to ensure that multiple drop dispensation conflict is not created in the adjacent pass.

However, if there is no adjacent pass for which moving drop dispensation to a corresponding mask entry 116 (that does not already specify drop dispensation) would not create a multiple drop dispensation conflict, drop dispensation may nevertheless be moved to the next (as opposed to prior) pass. Even though a multiple drop dispensation conflict is created in this next pass, the conflict is resolved in the current pass. Moreover, the conflict in the next pass may be resolvable without creating a multiple drop dispensation in an adjacent pass when the next pass is processed in the method 300.

In another implementation, a multi drop dispensation conflict is not created in the next pass. Rather, if there is no adjacent pass for which moving drop dispensation to a corresponding mask entry 116 (that does not already specify drop dispensation), then the next adjacent pass is checked. In practice, two inspections have been found to be sufficient for print modes having six or more passes. That is, if either adjacent pass does not have a corresponding empty mask entry 116, then it has been found that that either next adjacent pass will have a corresponding empty mask entry 116.

If the current pass is not the last pass (308), then the current pass is advanced to the next pass (310), and the method 300 repeated with this new current pass (304). Once all the passes have been processed, then the method 300 is finished (312). For the pixel in question, then, per-pass repeated drop dispensation conflicts are resolved insofar as possible.

As described, if N>1 mask entries 116 in a pass specify print fluid drop dispensation for a pixel, then drop dispensation is moved from each of (N−1) of these mask entries 116 to a (corresponding) mask entry 116 in the different or same adjacent pass. For example, if two mask entries 116 in a pass specify dispensation, then drop dispensation is moved from one of these mask entries 116 to a corresponding mask entry 116 in an adjacent pass. If three mask entries 116 specify drop dispensation, then dispensation is moved from two of these mask entries 116 to corresponding mask entries 116 in the same or different adjacent pass.

Which particular mask entry 116 is selected for drop dispensation movement to an adjacent pass can affect image quality, however. Moreover, the particular mask entry 116 that is selected for drop dispensation to an adjacent pass to maintain image quality can differ depending on the number of passes that are being used. A different mask entry 116 should be selected in a high-pass, high-quality print mode as compared to a low-pass, high-speed print mode.

A high-pass, high-quality print mode may be considered as a print mode having a number of the passes greater than a threshold. A low-pass, low-quality print mode may similarly be considered as a print mode having a number of passes less than this threshold. The threshold, which may be seven, thus differentiates between these two print modes. Approaches for resolving repeated drop dispensation conflict for a pixel within the mask entries 116 of a pass for these different print modes are now described.

Figure 4:
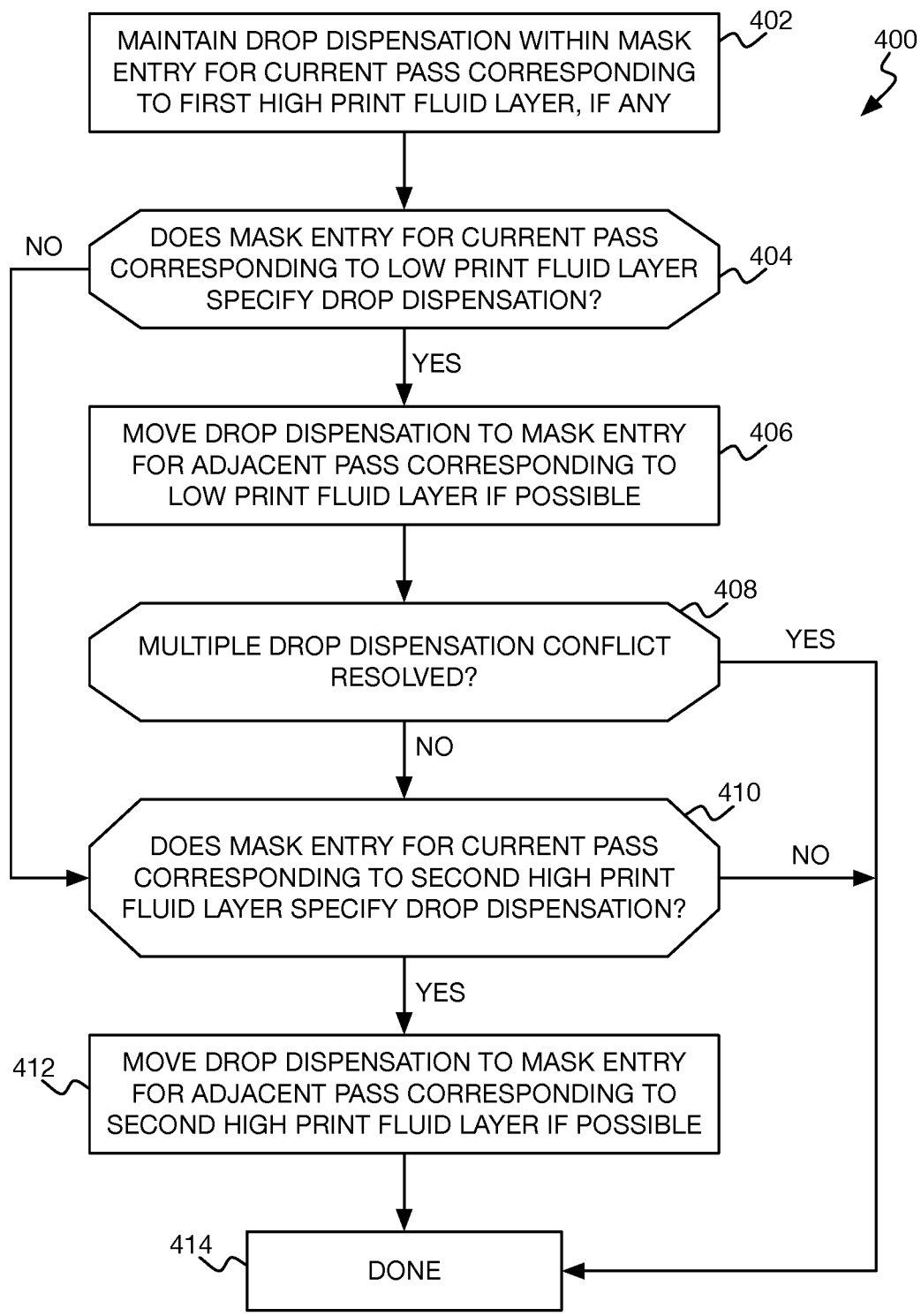
FIG. 4 is a flowchart of an example method for moving drop dispensation for a pixel from a mask entry for a pass to a mask entry for an adjacent pass, in a high-pass, high-quality print mode.

FIG. 4 shows an example method 400 for moving drop dispensation for a pixel from each of one or multiple mask entries 116 in a current pass to a corresponding mask entry in an adjacent pass, in the high-pass, high-quality print mode. The method 400 may be performed to realize (306) of the method 300 when a high-pass, high-quality print mode is used. The method 400 pertains to the case in which there are four halftone layers 114, including a low print fluid layer and first and second high print fluid layers.

In response to the mask entry 116 corresponding to the first high print fluid layer specifying print fluid drop dispensation, drop dispensation within this mask entry 116 is maintained in the current pass (402). That is, drop dispensation is not moved from the mask entry 116 corresponding to the first high print fluid layer to the corresponding mask entry 116 in an adjacent pass. The integrity of the first high print fluid layer mask entry 116 is preserved in the current pass because the first high print fluid layer is used most in this print mode.

If the mask entry 116 corresponding to the low print fluid layer specifies print fluid drop dispensation (404), however, then drop dispensation is moved from this mask entry 116 of the current pass to the low print fluid layer mask entry 116 of an adjacent pass that does not (406), if possible. Drop dispensation may not be possible if the low print fluid layer mask entry 116 of every adjacent pass already specifies fluid drop dispensation, and/or if moving such drop dispensation to the low print fluid layer mask entry 116 of an adjacent pass would itself create a multiple drop dispensation conflict.

Even if drop dispensation is successfully moved from the low print fluid layer mask entry 116 of the current pass to the corresponding mask entry 116 of an adjacent pass, the multiple drop dispensation conflict may still not be resolved. The multiple drop dispensation conflict is resolved just if two mask entries 116 of the current pass specify drop dispensation for a pixel. If three mask entries 116 do, then there is still a conflict that should be resolved.

Therefore, if the multiple drop dispensation conflict is not resolved as a result of successful or unsuccessful inter-pass drop dispensation movement at the low print fluid layer (408), then the mask entry 116 corresponding to the second high print fluid layer is examined. If the second high print fluid layer mask entry 116 in the current pass specifies drop dispensation (410), then dispensation is moved from this mask entry 116 to the corresponding mask in an adjacent pass that does not (412), again if possible.

The method 400 is then finished (414). The multiple drop dispensation conflict is resolved in the current pass if after completion just one mask entry 116 of the current pass specifies drop dispensation for the pixel in question. The conflict is not resolved if moving a mask entry 116 for either or both of the low print fluid layer and the second high print fluid layer is not possible.

The method 400, which pertains to the high-pass, high-quality print mode, favors exchanging drop dispensation between the mask entries 116 in adjacent passes in the low print fluid layer and the second high print fluid layer. Exchanging drop dispensation at the low print fluid layer in particular results in minimal image quality degradation particularly when the corresponding mask type 112 is the square sine mask type 204, which is more robust in high-pass print modes.

Figure 5:
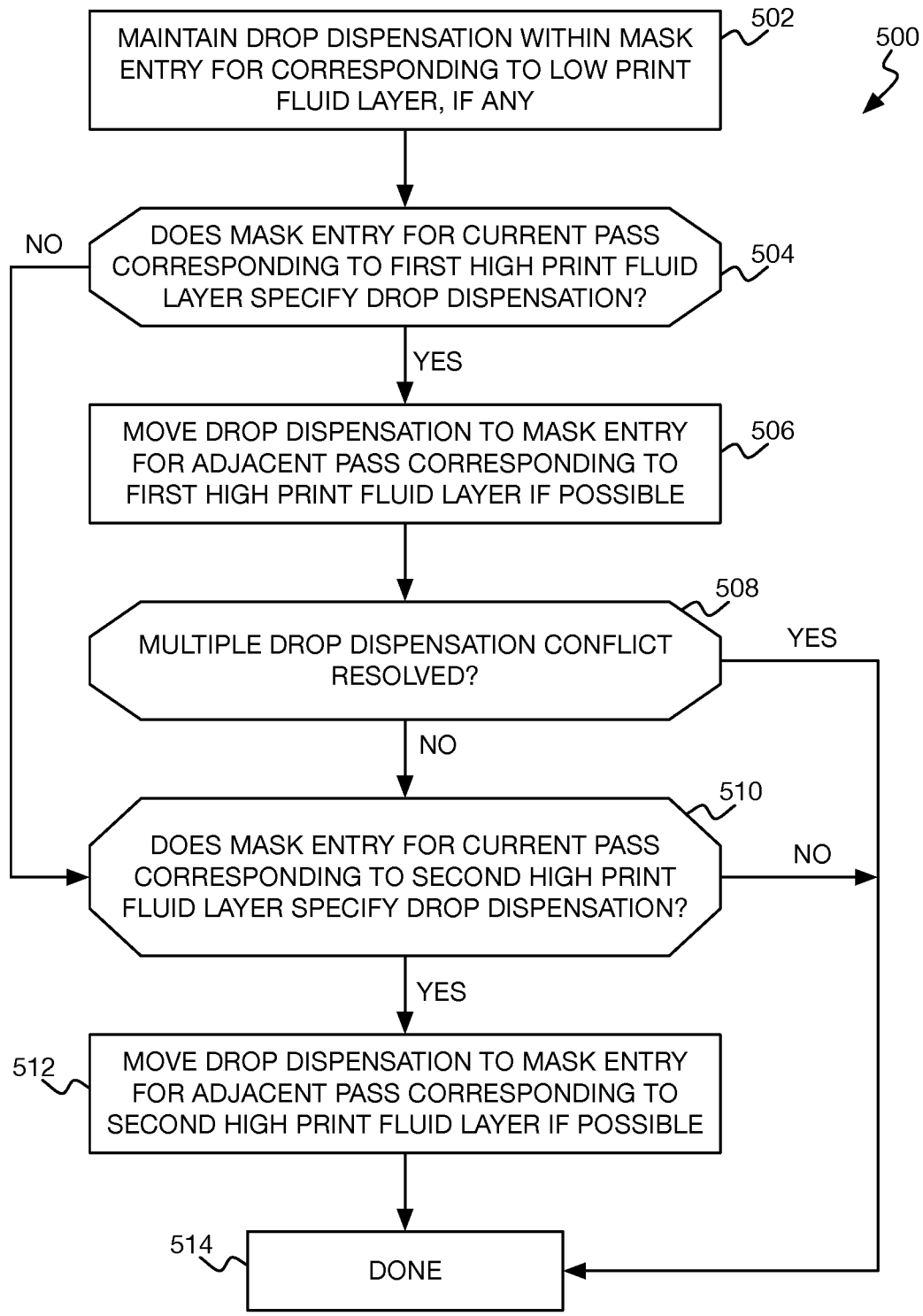
FIG. 5 is a flowchart of an example method for moving drop dispensation for a pixel from a mask entry for a pass to a mask entry for an adjacent pass, in a low-pass, high-speed print mode.

FIG. 5 shows an example method 500 for moving drop dispensation for a pixel from each of one or multiple mask entries 116 in a current pass to a corresponding mask entry in an adjacent pass, in the low-pass, high-speed print mode. The method 500 may similarly be performed to realize part (306) of the method 300 when a low-pass, high-speed print mode is used. The method 500 also pertains to the case in which there are four halftone layers 114, including a low print fluid layer and first and second high print fluid layers.

In response to the mask entry 116 corresponding to the low print fluid layer specifying print fluid drop dispensation, drop dispensation within this mask entry 116 is maintained in the current pass (502). That is, drop dispensation is not moved from the mask entry 116 corresponding to the low print fluid layer to the corresponding mask entry 116 in an adjacent pass. The integrity of the low print fluid layer is preserved in the current pass, particularly in the case in which the mask type 112 corresponding to this layer is the square sine mask type 204, which is less robust against drop dispensation exchange in low-pass print modes.

If the mask entry 116 corresponding to the first high print fluid print layer specifies print fluid drop dispensation (504), however, then drop dispensation is moved from this mask entry 116 of the current pass to the first high print fluid mask entry 116 of an adjacent pass that does not (506), if possible. If the multiple drop dispensation conflict is not resolved as a result of successful or unsuccessful inter-pass drop dispensation move at the first high print fluid layer (508), then the mask entry 116 corresponding to the second high print fluid layer is examined. If the second high print fluid layer mask entry 116 in the current pass specifies drop dispensation (510), then dispensation is moved to the corresponding mask in an adjacent pass that does not (512), if possible.

The method 500 is then finished (514). As with the method 400, the multiple drop dispensation conflict is resolved in the current pass if after completion just one mask entry 116 of the current pass specifies drop dispensation for the pixel in question. The method 500, however, favors exchanging drop dispensation between the mask entries 116 in adjacent passes in the first and second high print fluid layers, so as to reduce image quality degradation that may otherwise result if exchange occurred at the low print fluid layer.

Figure 6:
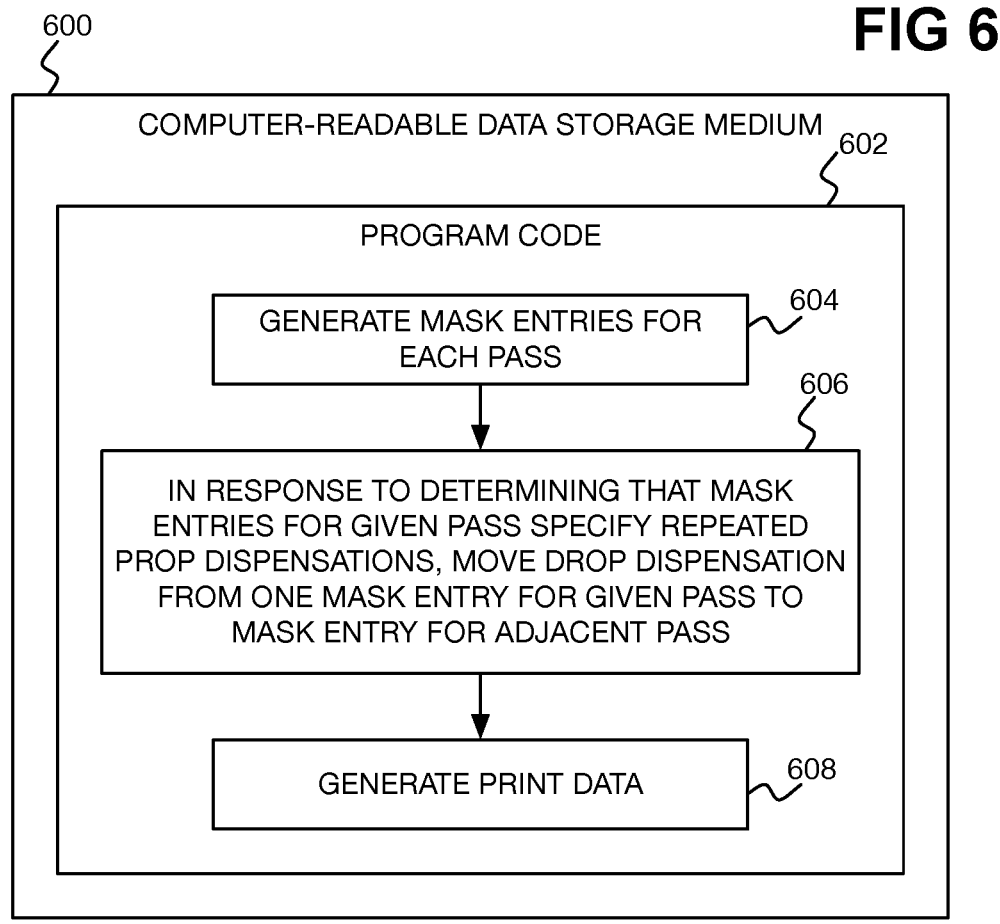
FIG. 6 is a diagram of an example non-transitory computer-readable data storage medium.

FIG. 6 shows an example non-transitory computer-readable data storage medium 600 storing program code 602 executable by a processor to perform processing. The processor may be part of a printing device or part of a host computing device communicatively connected to the printing device. The medium 600 may be a memory or other type of computer-readable data storage medium. The processor and the medium 600 may be integrated within an application-specific integrated circuit (ASIC) in the case in which the processor is a special-purpose processor. The processor may instead be a general-purpose processor, such as a central processing unit (CPU), in which case the medium 600 is separate from the processor.

The processing includes generating, based on different types 112 of masks to use when dispensing print fluid drops over multiple passes for printing an image based on image data 102, mask entries 116 for each pass (604). The different types 112 of masks and the mask entries 116 for each pass correspond to different halftone layers 114. The processing includes, in response to determining that the mask entries 116 for a given pass specify repeated print fluid drop dispensation for a pixel of the image data 102, moving drop dispensation for the pixel from one of the mask entries 116 for the given pass to a mask entry 116 for an adjacent pass that does not specify drop dispensation for the pixel (606).

The processing generating print data 124 for printing the image from the mask entries 116 (608).

Figure 7:
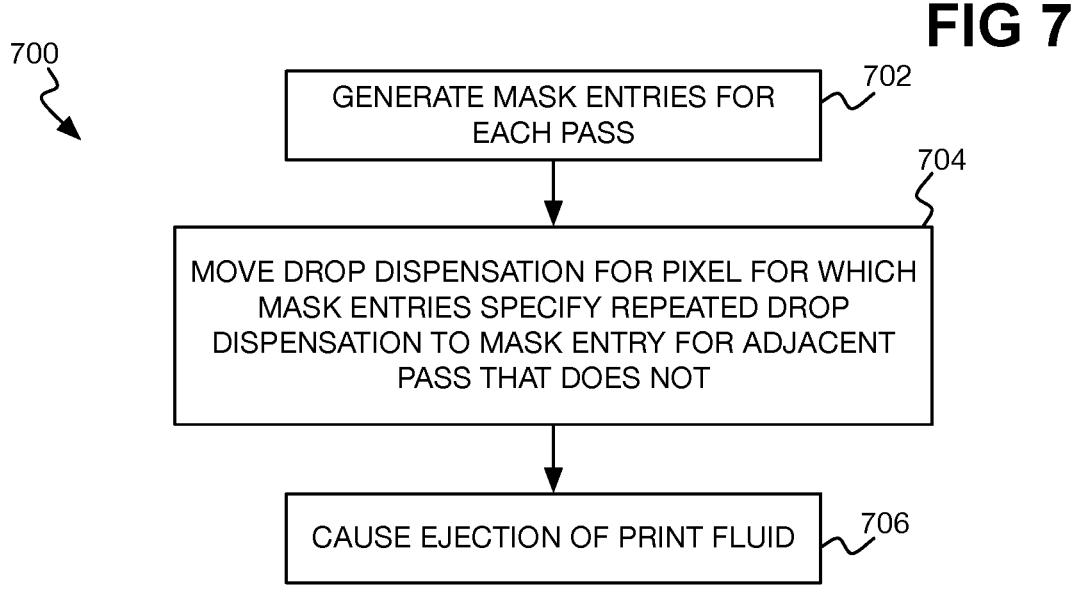
FIG. 7 is a flowchart of an example method.

FIG. 7 shows an example method 700. The method 700 may be performed by a processor of a printing device or of a host computing device communicatively connected to the printing device. The method 700 includes generating mask entries 116 for each of a number of passes over which print fluid drops are to be dispensed for printing an image, based on different types 112 of masks and based on image data 102 for the image (702). The method 700 includes moving print fluid drop dispensation for a pixel for which the mask entries 116 for a given pass specify repeated print fluid drop dispensation to a mask entry 116 for an adjacent pass that does not specify print fluid drop dispensation for the pixel (704). The method 700 includes causing of print fluid to print the image, based on the generated mask entries 116 (706).

Figure 8:
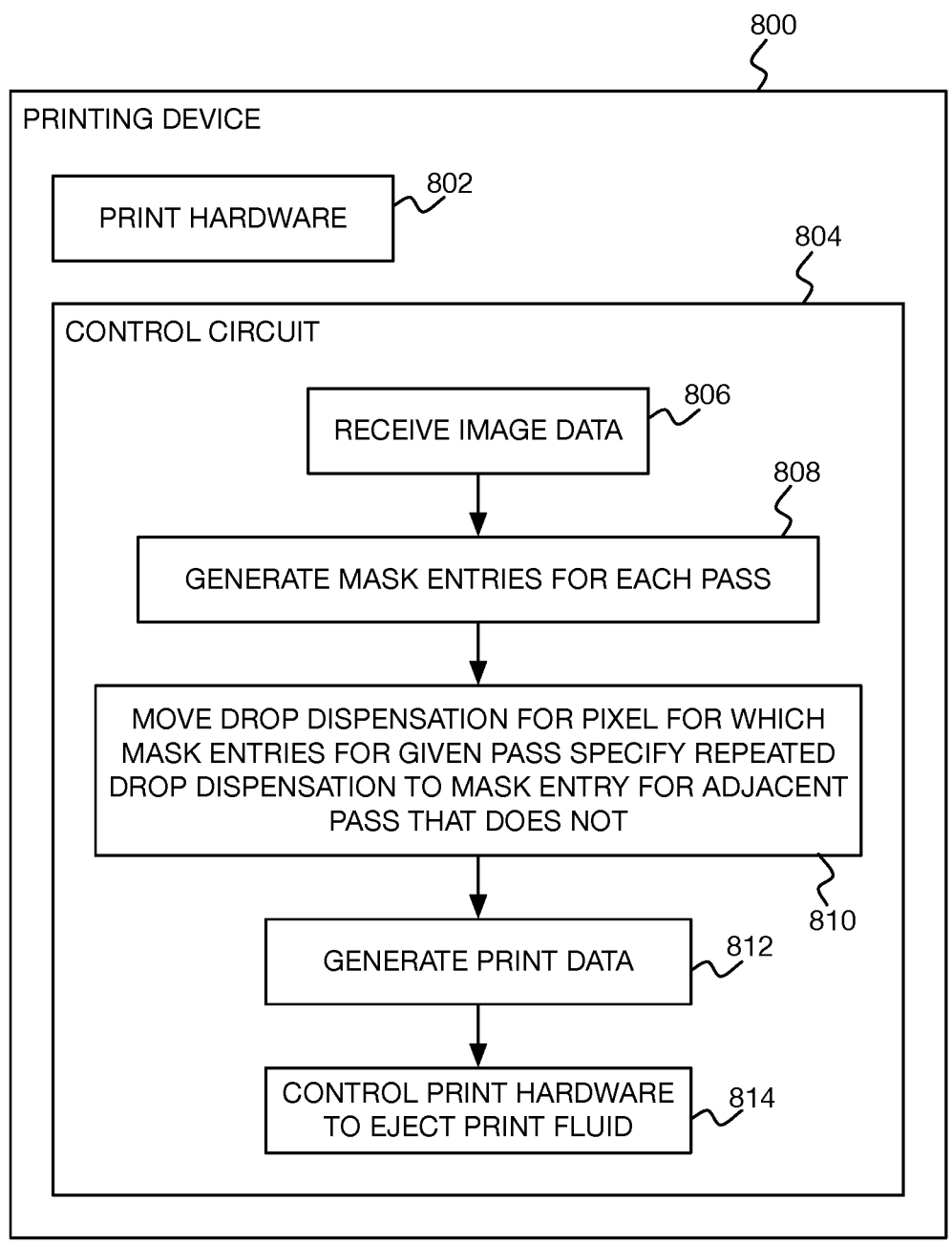
FIG. 8 is a block diagram of an example printing device.

FIG. 8 shows an example printing device 800. The printing device 800 can be a standalone printer, such as a digital print press. The printing device 800 includes print hardware 802 to eject print fluid onto a substrate to print an image on the substrate. The print hardware 802 may be or include one or multiple printheads that each include nozzles from which print fluid drops can be ejected (i.e., dispensed). The printing device 800 includes a control circuit 804, which may be implemented as an ASIC, as a separate general-purpose processor and memory, or in another manner.

The control circuit 804 receives image data 102 for the image (806). The control circuit 804 generate mask entries 116 for each of a number of passes over which print fluid drops are to be dispensed for printing the image, based on different types of masks and based on the image data 102 (808). The control circuit 804 moves print fluid drop dispensation for a pixel for which the mask entries 116 for a given pass specify repeated print fluid drop dispensation to a mask entry 116 for an adjacent pass that does not specify print fluid drop dispensation for the pixel (810). The control circuit 804 generates print data 124 based on the mask entries 116 (812), and controls the print hardware 802 to eject the print fluid in accordance with the generated print data 124 (814).

Techniques have been described for resolving repeated print fluid drop dispensation for a pixel within the mask entries 116 for a given pass. Fluid drop dispensation is moved from a mask entry 116 in the given pass to a (corresponding) mask entry 116 in an adjacent pass. Fluid drop dispensation is moved to an adjacent pass to maintain image quality as much as possible. The halftone level at which drop dispensation occurs can be selected depending on the number of passes in the print mode, also to maintain image quality as much as possible.

We claim:

1. A non-transitory computer-readable data storage medium storing program code executable by a processor to perform processing comprising:
   generating, based on a plurality of different types of masks to use when dispensing print fluid drops over a plurality of passes for printing an image based on image data, mask entries for each pass, the different types of masks and the mask entries for each pass corresponding to different halftone layers;
   in response to determining that the mask entries for a given pass specify repeated print fluid drop dispensation for a pixel of the image data, moving drop dispensation for the pixel from one of the mask entries for the given pass to a mask entry for an adjacent pass that does not specify drop dispensation for the pixel; and
   generating print data for printing the image from the mask entries.

2. The non-transitory computer-readable data storage medium of claim 1, wherein the processing further comprises:
   printing the image using the generated print data.

3. The non-transitory computer-readable data storage medium of claim 1, wherein the different halftone layers comprise a low print fluid layer, a first high print fluid layer, and a second high print fluid layer,
   wherein the low print fluid layer corresponds to an amount or density of print fluid drops under a drop amount or drop density threshold,
   and wherein each of the first and second high print fluid layers corresponds to an amount or density of print fluid drops over the drop amount or drop density threshold.

4. The non-transitory computer-readable data storage medium of claim 3, wherein moving drop dispensation for the pixel comprises, in response to a number of the passes being greater than an pass threshold differentiating between low-speed, high-quality print modes and high-speed, low-quality print modes:
   in response to the mask entry for the given pass corresponding to the first high print fluid layer specifying drop dispensation for the pixel, maintaining drop dispensation for the pixel within the mask entry for the given pass corresponding to the first high print fluid layer specifying drop dispensation.

5. The non-transitory computer-readable data storage medium of claim 4, wherein moving drop dispensation for the pixel further comprises, in response to the number of the passes being greater than the pass threshold differentiating between low-speed, high-quality print modes and high-speed, low-quality print modes:
   in response to the mask entry for the given pass corresponding to the low print fluid layer specifying drop dispensation for the pixel, moving drop dispensation for the pixel from the mask entry for the given pass corresponding to the low print fluid layer to a mask entry for an adjacent pass corresponding to the low print fluid layer that does not specify drop dispensation for the pixel.

6. The non-transitory computer-readable data storage medium of claim 5, wherein moving drop dispensation for the pixel further comprises, in response to the number of the passes being greater than the pass threshold differentiating between low-speed, high-quality print modes and high-speed, low-quality print modes:
   in response to the mask entry for the given pass corresponding to the second high print fluid layer specifying drop dispensation for the pixel, moving drop dispensation for the pixel from the mask entry for the given pass corresponding to the second high print fluid layer to a mask entry for an adjacent pass corresponding to the second high print fluid layer that does not specify drop dispensation for the pixel.

7. The non-transitory computer-readable data storage medium of claim 3, wherein moving drop dispensation for the pixel comprises, in response to a number of the passes being less than a pass threshold differentiating between low-speed, high-quality print modes and high-speed, low-quality print modes:
   in response to the mask entry for the given pass corresponding to the low print fluid layer specifying drop dispensation for the pixel, maintaining drop dispensation for the pixel within the mask entry for the given pass corresponding to the low print fluid layer specifying drop dispensation.

8. The non-transitory computer-readable data storage medium of claim 7, wherein moving fluid drop dispensation for the pixel further comprises, in response to the number of the passes less than the pass threshold differentiating between low-speed, high-quality print modes and high-speed, low-quality print modes:
in response to the mask entry for the given pass corresponding to the first high print fluid layer specifying drop dispensation for the pixel, moving drop dispensation for the pixel from the mask entry for the given pass corresponding to the first high print fluid layer to a mask entry for an adjacent pass corresponding to the first high print fluid layer that does not specify drop dispensation for the pixel.

9. The non-transitory computer-readable data storage medium of claim 8, wherein moving drop dispensation for the pixel further comprises, in response to the number of the passes being less than the pass threshold differentiating between low-speed, high-quality print modes and high-speed, low-quality print modes:
in response to the mask entry for the given pass corresponding to the second high print fluid layer specifying drop dispensation for the pixel, moving drop dispensation for the pixel from the mask entry for the given pass corresponding to the second high print fluid layer to a mask entry for an adjacent pass corresponding to the second high print fluid layer that does not specify drop dispensation for the pixel.

10. The non-transitory computer-readable data storage medium of claim 3, wherein the low print fluid layer specifies usage of a first quantity of print fluid drops per pixel,
and wherein the second high print fluid layer specifies usage of a second quantity of print fluid drops per pixel greater than the first quantity.

11. The non-transitory computer-readable data storage medium of claim 10, wherein the first high print fluid layer specifies usage of the first quantity of print fluid drops per pixel.

12. The non-transitory computer-readable data storage medium of claim 3, wherein the different type of mask corresponding to the low print fluid layer specifies print fluid drop dispensation frequency as a function of printhead nozzle position having a square sine wave shape.

13. The non-transitory computer-readable data storage medium of claim 3, wherein the different type of mask corresponding to either or both of the first and second high print fluid layers specifies print fluid drop dispensation frequency as a function of printhead nozzle position having a trapezoidal shape.

14. A printing device comprising:
print hardware to eject print fluid onto a substrate to print an image on the substrate;
a control circuit to:
receive image data for the image;
generate mask entries for each of a plurality of passes over which print fluid drops are to be dispensed for printing the image, based on different types of masks and based on the image data;
move print fluid drop dispensation for a pixel for which the mask entries for a given pass specify repeated print fluid drop dispensation to a mask entry for an adjacent pass that does not specify print fluid drop dispensation for the pixel;
generate print data based on the mask entries; and
control the print hardware to eject the print fluid in accordance with the generated print data.

15. A method comprising:
generating, by a processor, mask entries for each of a plurality of passes over which print fluid drops are to be dispensed for printing an image, based on different types of masks and based on image data for the image;
moving, by a processor, print fluid drop dispensation for a pixel for which the mask entries for a given pass specify repeated print fluid drop dispensation to a mask entry for an adjacent pass that does not specify print fluid drop dispensation for the pixel; and
causing, by the processor, ejection of print fluid to print the image, based on the generated mask entries.

* * * * *